· US008219382B2

United States Patent
Kim et al.

(10) Patent No.: US 8,219,382 B2
(45) Date of Patent: Jul. 10, 2012

(54) DOMAIN-ADAPTIVE PORTABLE MACHINE TRANSLATION DEVICE FOR TRANSLATING CLOSED CAPTIONS USING DYNAMIC TRANSLATION RESOURCES AND METHOD THEREOF

(75) Inventors: Young Kil Kim, Daejeon (KR); Seong Il Yang, Daejeon (KR); Chang Hyun Kim, Daejeon (KR); Young Ae Seo, Daejeon (KR); Mun Pyo Hong, Daejeon (KR); Sung Kwon Choi, Daejeon (KR); Ki Young Lee, Daejeon (KR); Oh Woog Kwon, Daejeon (KR); Yoon Hyung Roh, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1162 days.

(21) Appl. No.: 11/834,180

(22) Filed: Aug. 6, 2007

(65) Prior Publication Data
US 2008/0052061 A1      Feb. 28, 2008

(30) Foreign Application Priority Data
Aug. 25, 2006   (KR) .................. 10-2006-0080921

(51) Int. Cl.
*G06F 17/28* (2006.01)
*H04N 7/00* (2011.01)
*H04N 11/00* (2006.01)
(52) U.S. Cl. ............... 704/2; 704/3; 704/4; 348/468
(58) Field of Classification Search ............ 704/2, 270
See application file for complete search history.

(56) References Cited

U.S. PATENT DOCUMENTS

| 4,831,529 | A | 5/1989 | Miike et al. |
|---|---|---|---|
| 6,182,027 | B1 | 1/2001 | Nasukawa et al. |
| 6,754,435 | B2 * | 6/2004 | Kim ........................... 386/241 |
| 7,130,790 | B1 * | 10/2006 | Flanagan et al. ............... 704/2 |
| 7,191,117 | B2 * | 3/2007 | Kirby et al. .................... 704/9 |
| 7,353,166 | B2 * | 4/2008 | Li et al. ......................... 704/8 |

(Continued)

FOREIGN PATENT DOCUMENTS

KR       1019950013128       10/1995

(Continued)

OTHER PUBLICATIONS

Sanhwa Yuh, "Multilingual Machine Translation of Closed Captions for Digital Television with Dynamic Dictionary Adaptation", Jul. 7, 2006, Dissertation, Department of Computer Science, Sogang University, pp. 1-104.*

(Continued)

*Primary Examiner* — Richemond Dorvil
*Assistant Examiner* — Olujimi Adesanya
(74) *Attorney, Agent, or Firm* — Ladas & Parry LLP (57) ABSTRACT

A domain-adapted portable machine translation device for closed captions using dynamic translation resources and a method thereof are provided. The device and method improve translation performance with respect to various specialized domains by automatically recognizing style and domain of a caption sentence, dynamically constructing specialized translation module and knowledge, and performing automatic translation with optimal translation resources suitable for a corresponding sentence.
Not only does the domain-adapted portable machine translation device for closed captions exhibit improved translation performance for sentences in various domains, but it can also be freely linked with various media devices through input/output terminals.

18 Claims, 2 Drawing Sheets

U.S. PATENT DOCUMENTS

| | | | |
|---|---|---|---|
| 7,428,487 B2 * | 9/2008 | Wang et al. | 704/10 |
| 7,571,455 B2 * | 8/2009 | Lee | 725/109 |
| 7,711,543 B2 * | 5/2010 | Bangalore et al. | 704/3 |
| 2003/0169369 A1 * | 9/2003 | Kahn | 348/468 |
| 2005/0021322 A1 | 1/2005 | Richardson et al. | |
| 2005/0276490 A1 * | 12/2005 | Kim | 382/232 |

FOREIGN PATENT DOCUMENTS

| | | |
|---|---|---|
| KR | 1019970056985 | 7/1997 |
| KR | 1020030030687 | 4/2003 |
| KR | 1020030094632 | 12/2003 |
| KR | 1020040111188 | 12/2004 |
| KR | 1020050064575 | 6/2005 |
| KR | 1020060017286 | 2/2006 |

OTHER PUBLICATIONS

Yang et al, "Korean to English TV caption translator: CaptionEye/KE", Proc. 6th Natural Language Processing Pacific Rim Symposium (NLPRS), Tokyo, Japan, Nov. 27-30, (2001), pp. 639-645.*

Nyberg et al, "A Real-Time MT System for Translating Broadcast Captions", 1997, In Proceedings of the Machine Translation Summit VI, pp. 51-57.*

Young-Kil Kim, et al; "Pre-Processing of Korean Syntactic Analyzer for Korean to English MT", Journal of KIISE (Korean Institute of Information Scientists and Engineers), fall 2001, vol. 28, No. 2.

KIPO Notice of Patent Grant dated Jun. 3, 2008 for the corresponding application KR 10-2006-0080921.

* cited by examiner

FIG. 1

DOMAIN-ADAPTIVE PORTABLE MACHINE TRANSLATION DEVICE FOR TRANSLATING CLOSED CAPTIONS USING DYNAMIC TRANSLATION RESOURCES AND METHOD THEREOF

CROSS-REFERENCE TO RELATED APPLICATION

This application claims priority to and the benefit of Korean Patent Application No. 2006-80921, filed Aug. 25, 2006, the disclosure of which is incorporated herein by reference in its entirety.

BACKGROUND

1. Field of the Invention

The present invention relates to a domain-adaptive portable machine translation device for closed captions using dynamic translation resources and a method thereof. More particularly, the present invention relates to a machine translation device and a method thereof, which can improve translation performance in various specialized domains by dynamically constructing a specified translation module and knowledge suitable for automatically recognized style and domain of a caption sentence, and automatically translating a corresponding sentence with optimized translation resources.

2. Discussion of Related Art

While a Japanese-Korean/Korean-Japanese machine translation system has been successfully commercialized, most machine translation systems for translation between heterogeneous pattern languages such as Korean-English/English-Korean and Korean-Chinese/Chinese-Korean translation, etc. have enjoyed little commercial success. The reason for this is that, although translation performance varies depending on the target language and the passage to be translated, machines generally exhibit poor performance when translating between heterogeneous pattern languages.

Recently, attempts are being made to enhance output quality by creating specialized machine translation systems programmed for sentence characteristics in a specific domain of application. As a result of such efforts, translation systems for partially specialized domains such as the domain of technical manuals, the patent domain, the bible translation domain, etc. have been commercialized with varying degrees of success.

In particular, fueled by the spread of satellite TV, there is increasing demand for a machine translation system for closed captions that can provide viewers with captions in their language of choice by automatically translating a caption signal extracted from a broadcast signal.

Here, closed captions refer to an image signal output from a broadcasting station containing the caption signal. Recently, many broadcasting companies are providing such closed captioning for the hearing impaired. In 1990, the United State made it obligatory for 13-inch or more televisions to have a closed captioning function, and domestic television broadcasting stations and CATV companies are expanding closed captioned programs as well. Also, closed captioned programs in foreign languages provided by CNN, NHK, AFKN, etc. are expected to continue to expand.

However, in closed captions on TV, colloquial style and literary style are mixed in various genres, for example, drama, culture and current events, entertainment, etc., as well as the news. Especially, in the news, various technical terms and expressions from almost all domains are used, so there is technical difficulty in developing a machine translation system for closed captions which can provide high quality output on a commercial scale.

To overcome this technical difficulty, Korean Patent Publication No. 1997-56985 (Publication date: 1997 Jul. 31) discloses a TV with a function for translating closed captions. The TV has separate Korean and foreign-language translation parts so as to display caption data in a language selected by a viewer, thus conveniently meeting viewers' needs.

However, the TV with a closed captioning function performs a process of extracting the caption data from the input broadcast signal, translating the caption data into the selected language, and then displaying the translated result on the TV screen. Thus, it has disadvantages in that a TV that supports closed captioning must be separately purchased, and when the broadcast signal is input through another media device, for example, a satellite set-top box, a video player, a DMB terminal, etc., the captioning function cannot be provided.

Moreover, the TV with the closed captioning function performs translation only on the caption data, and thus it cannot provide high output quality for colloquial style and literary style sentences, and sentences used in various technical domains dealt with in captioned programs.

For instance, in the news, "die" is usually used as a verb meaning "stop living," but in a science domain, "die" is most often used as a noun meaning "mold." So, if "die" is mistranslated as a verb meaning "stop living" in a science domain caption, it is because the translation was performed without consideration of the application domain.

That is, since the TV with a function of translating closed captions applies the same translation module and knowledge to all domains as a whole, when various styles and technical sentences are input, it is obvious that translation quality will be degraded.

Therefore, there have been many attempts to improve the translation quality in consideration of technical domains. A representative method is a user-adaptive machine translation method in which errors in the translated result are corrected and the corrected result is stored as additional translation knowledge and automatically applied the next time, thereby improving translation quality for similar input sentences.

As the user-adaptive machine translation method described above, a translation memory-based adaptive translation method is generally used, in which a user adds his/her own translation dictionary or manually registers a pattern-based translation corpus and then applies the result to sentence translation.

A related, conventional adaptive machine translation method is disclosed in Korean Patent Publication No. 2004-0111188 (Publication date: 2004 Dec. 31). The adaptive machine translation method disclosed in Korean Patent Publication No. 2004-0111188 improves translation quality by preventing repetition of errors. This is accomplished by a user of the machine translation system directly correcting errors and converting the corrected result into an input knowledge format of the system, and then applying the converted result to the translation system again.

However, in the above methods, the user has to continuously proofread and correct an enormous amount of machine translated documents. Proofreading on a small scale is not effective in improving machine translation performance for documents in various domains.

Also, the adaptive machine translation method uses a data-driven machine translation engine to avoid conflict of translation data or rules. In this case, since there is a limit to adding word-by-word translation correction knowledge to improve translation performance, a separate statistics database built from Copious amounts of translation knowledge is required.

Consequently, in order to commercialize the portable machine translation system for closed captions, it is necessary to improve translation performance by automatically recognizing target domains and styles and constructing a specialized translation environment, and enable linking with various types of media devices.

SUMMARY OF THE INVENTION

The present invention is directed to providing a domain-adaptive portable machine translation device for closed captions and a method thereof capable of improving translation performance with respect to various specialized domains by automatically recognizing a style and a domain of a caption, dynamically constructing a specialized translation module and knowledge, and automatically translating a corresponding sentence with optimized translation resources.

The present invention is also directed to providing a domain-adaptive portable machine translation device for closed captions and a method thereof which can be operated independently from other media devices such as a PC connected to the Internet, a set-top box for a satellite TV, a cable TV, a video player, a USB disk, etc., and also can be linked with such media devices through input/output terminals without limitation.

One aspect of the present invention provides a domain-adaptive portable machine translation device for closed captions, comprising: a keyword extraction part extracting keywords for recognizing style and domain of a caption sentence in an input broadcast signal; a style and domain recognition part recognizing the style and domain of the caption sentence based on the extracted keywords, a pre-constricted predicate ending/style statistical dictionary and a pre-constructed vocabulary/domain statistical dictionary; a dynamic translation knowledge construction part dynamically constructing translation knowledge based on the recognized style and domain, and then loading the result into a dynamic translation DB of a main memory; a dynamic translation module construction part dynamically reconstructing a translation module based on the recognized style and domain; a morpheme analysis part analyzing morphemes of the caption sentence under the control of the dynamic translation module construction part; a sentence pattern application part performing sentence-by-sentence translation by applying a sentence pattern to the caption sentence under the control of the dynamic translation module construction par; a syntax analysis part analyzing syntax of the caption sentence under the control of the dynamic translation module construction part; and a pattern-based translation generation part producing a pattern-based translation of the caption sentence based on the syntax analysis result.

Another aspect of the present invention provides a translation method for a domain-adaptive portable machine translation device for closed captions, comprising the steps of: (a) extracting a keyword for analyzing style and domain of a caption sentence in an input broadcast signal; (b) recognizing the style and domain of the caption sentence based on the extracted keyword, a pre-constructed predicate ending/style statistical dictionary and a pre-constructed vocabulary/domain statistical dictionary; (c) dynamically constructing translation knowledge based on the recognized style and domain and loading the knowledge into a dynamic translation DB of a main memory; (d) dynamically reconstructing a translation module based on the recognized style and domain; (e) analyzing morphemes of the caption sentence based on the recognized style and domain; (f) performing sentence-by-sentence translation by applying a sentence pattern to the caption sentence based on the recognized style and domain; (g) analyzing syntax of the caption sentence based on the recognized style and domain; and (h) producing a pattern-based translation of the caption sentence based on the syntax analysis result.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The foregoing and other objects, features and advantages of the invention will be apparent from the following more particular description of exemplary embodiments of the invention, as illustrated in the accompanying drawings.

Figure 1:
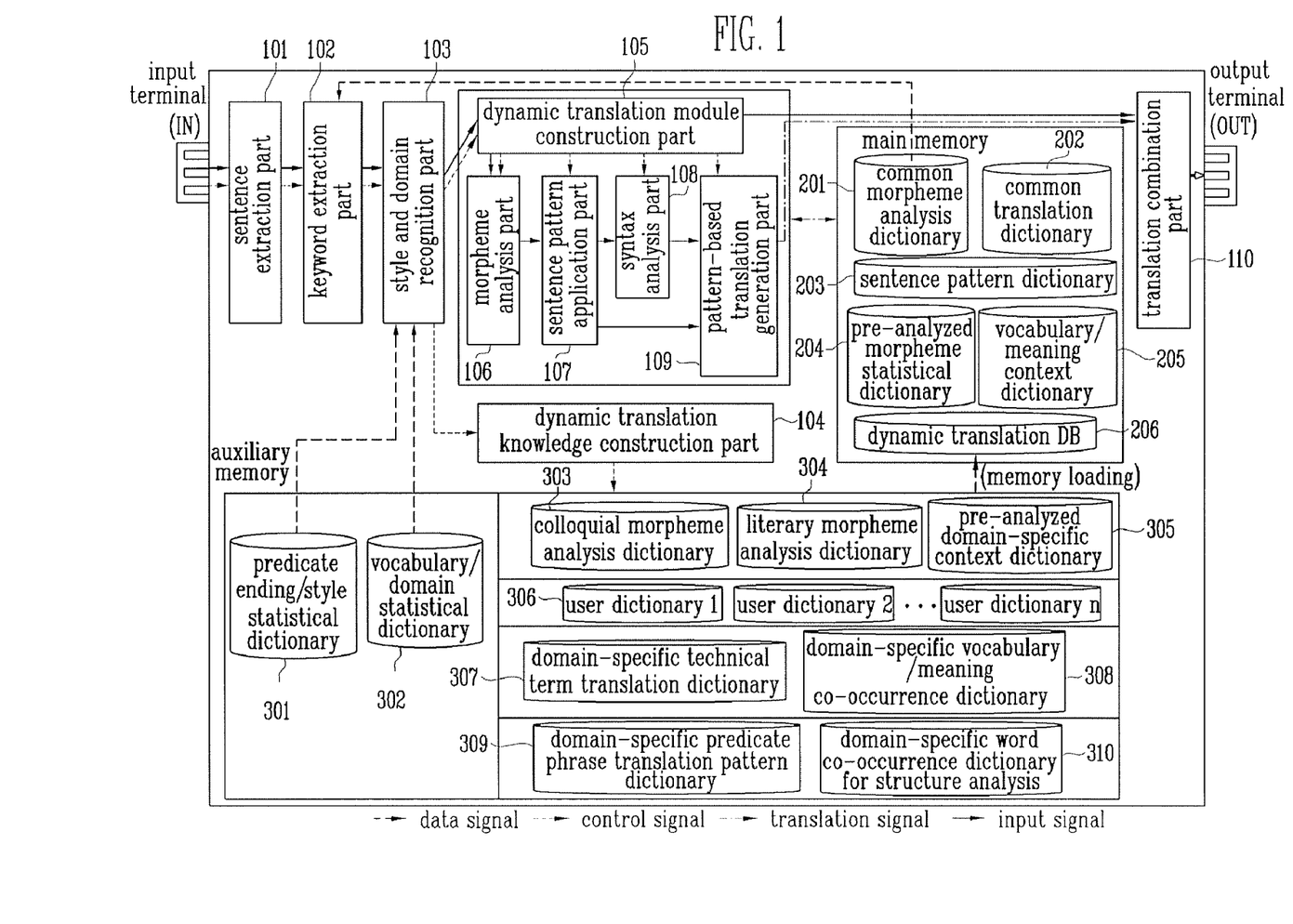
FIG. 1 is a block diagram of a structure of a domain-adaptive portable machine translation device for closed captions according to the present invention.

FIG. 1 is a block diagram of a structure of a domain-adaptive portable machine translation device for closed captions according to the present invention.

As illustrated in FIG. 1, the domain-adaptive portable machine translation device for closed captions comprises: an input terminal IN for inputting a broadcast signal, a sentence extraction part 101 extracting a caption sentence from the input broadcast signal through the input terminal IN, a keyword extraction part 102 extracting keywords from the caption sentence extracted by the sentence extraction part 101, a style and domain recognition part 103 recognizing style and domain of the caption sentence based on the extracted keywords, a pre-constructed predicate endings/style statistical dictionary 301 and a pre-constructed vocabulary/domain statistical dictionary 302, a dynamic translation knowledge construction part 104 dynamically constructing translation knowledge with the recognized style and domain and loading the constructed result into a dynamic translation DB 206 of a main memory, a dynamic translation module construction part 105 dynamically reconstructing a translation module with the recognized style and domain, a morpheme analysis part 106 analyzing morphemes of the caption sentence, a sentence pattern application part 107 applying a sentence pattern to the caption sentence so as to perform sentence-by-sentence translation, a syntax analysis part 108 analyzing syntax of the caption sentence when sentence patter application fails, a pattern-based translation generation part 109 producing a pattern-based translation of the caption sentence, a translation combination part 110 combining the input broadcast signal and the translation, and an output terminal OUT outputting the broadcast signal combined in the translation combination part 110.

The input terminal IN may provide a USB port/video terminal/audio terminal/coaxial cable terminal for input of the broadcast signal, and the output terminal OUP may include a USB port/video terminal/audio terminal/coaxial cable terminal for output of the broadcast signal.

The sentence extraction part 101 extracts the caption sentence from the input broadcast signal through the input terminal IN, and outputs the extracted result as a translation target sentence.

Also, when a USB disc is connected to the USB port to update the translation knowledge and transmit a control signal, the sentence extraction part 101 extracts a sentence to be translated from a translation target file by separating a control file and a translation knowledge file in the USB disc.

Here, the control file contains all necessary information for dynamically constructing the translation module and the translation knowledge later, for example, user data, domain data, etc., wherein the user and domain data may be manually set by the control file.

And, in the translation knowledge file, translation knowledge is written in the form of "additional vocabulary/translated additional vocabulary/transaction type (add/delete/modify)/user ID," and thereby new entries may be added to a user dictionary.

The keyword extraction part 102 analyzes morphemes of the caption sentence received from the sentence extraction part 101 with reference to a common morpheme analysis dictionary 201 stored in the main memory, and extracts keywords corresponding to nouns or declinable words from the morpheme analysis result.

The style and domain recognition part 103 recognizes style and domain of the caption sentence based on the keywords extracted from the keyword extraction part 102 and the pre-constructed predicate ending/style statistical dictionary 301 and vocabulary/domain statistical dictionary 302. A method of recognizing the style and domain will be described in more detail below.

First, the method of recognizing the style is as follows. The style and domain recognition part 103 determines whether the caption sentence conforms to a literary style or a colloquial style by comparing the frequency of a last word of the caption sentence occurring in the literary style with the frequency of a last word of the caption sentence occurring in the colloquial style according to the predicate ending/style statistical dictionary 301.

That is, the predicate ending/style statistical dictionary 301 extracts frequency statistical data of predicate ending and mood from the morpheme analysis result for a colloquial corpus and a literary corpus, and stores the extracted results by separating them into {last word/frequency in colloquial style frequency/literary style frequency}. Accordingly, by comparing the frequency of a corresponding last word occurring in the colloquial style with the frequency of a corresponding last word occurring in the literary style, it can be determined whether the last word of the caption sentence is literary style or colloquial style.

In an exemplary embodiment of the present invention, style is either colloquial style or literary style. Colloquial style is divided into 5 domains: drama, talk show, entertainment, interview and other, and literary style is divided into 3 domains: news, educational, and other. And, the news domain is subdivided into 10 sub-domains: politics, economy, society, life and culture, international, science, entertainment, sports, weather, and other.

Second, the method of recognizing a domain is as follows. The style and domain recognition part 103 determines the domain of the caption sentence by comparing the frequency of the extracted keyword in the specific domain based on the pre-constructed vocabulary/domain statistical dictionary 302. The vocabulary/domain statistical dictionary 302 for determining a domain is realized as follows.

First, training corpora corresponding to the respective domains are collected, and morpheme vocabulary such as a noun and a declinable word are extracted therefrom. The extracted data on the domain of each term is constructed as a data in the form of {corresponding term/domain 1, frequency 1/domain 2, frequency 2/ . . . /domain n, frequency n} and stored in the vocabulary/domain statistical dictionary 302.

That is, since one term is used in many domains, the domain of the caption sentence may be simply determined by extracting the frequency of each term used in each domain and comparing it with the frequency of the keyword included in the caption sentence occurring in the specific domain.

When the style and domain of the caption sentence are determined, the dynamic translation knowledge construction part 104 loads a colloquial morpheme analysis dictionary 303 when the sentence is written in the colloquial style, or a literary morpheme analysis dictionary 304 when the sentence is written in the literary style, into the dynamic translation DB 206 of the main memory.

And, in the dynamic translation knowledge construction part 104, a special user dictionary 306 is loaded into the dynamic translation DB 206 with the user data contained in the control signal. A pre-analyzed domain-specific context dictionary 305, a domain-specific technical term translation dictionary 307 and a domain-specific vocabulary/meaning co-occurrence dictionary 308 are loaded into the dynamic translation DB 206 with the recognized domain data.

That is, the style and domain of the input caption sentence are recognized, and then suitable translation knowledge is dynamically constructed and loaded into the dynamic translation DB 206, which results in improved translation quality compared to a conventional system using common translation knowledge.

Then, the dynamic translation module construction part 105 receives the style and domain data of the caption sentence from the style and domain recognition part 103, and thereby controls the morpheme analysis part 106, the sentence pattern application part 107, the syntax analysis part 108 and the pattern-based translation generation part 109 to be suitable for the style and the domain. This is what is meant by dynamically constructing the translation module, as will be described in more detail below.

The morpheme analysis part 106 is for tokenizing the input caption sentence in units of morphemes by performing adaptive morpheme analysis based on heuristic rules specialized for each style and domain. The heuristic rules are formed by the dynamic translation module construction part 105 and may include rules about treatment of an abridged form, a predicate ending, etc., which are suitable for each style and domain.

Here, the morpheme analysis part 106 performs morpheme analysis based on the common morpheme analysis dictionary 201 and the pre-analyzed morpheme statistical dictionary 204 basically loaded into the main memory, and the colloquial morpheme analysis dictionary 303, the literary morpheme analysis dictionary 304, the pre-analyzed domain-specific context dictionary 305, the user dictionary 306, the domain-specific technical terms translation dictionary 307 and the domain-specific vocabulary/meaning co-occurrence dictionary 308 loaded into the dynamic translation DB 206 of the main memory.

A knowledge format and examples of the pre-analyzed morpheme statistical dictionary 204 and the pre-analyzed domain-specific context dictionary 305 used in the morpheme analysis part 106 will be discussed below.

[Pre-Analyzed Morpheme Statistical Dictionary]

knowledge format:: {corresponding word frequency pre-analysis1 probablity1 frequency1 pre-analysis2 probablity2 frequency2 . . . pre-analysis n probability n frequency n <domain1> . . . frequency pre-analysis1 probability1 frequency1 pre-analysis2 probablity2 frequency2 . . . pre-analysis n probability n frequency n <domain2> . . . frequency pre-analysis1 probability1 frequency1 pre-analysis2 probability2 frequency2 . . . pre-analysis n probability n frequency n <domain n>}

Example 1

{길이176 길N+가/J 0.64 길이]/N 0.28 길이/A 0.08 <literary style/general> 320 길/N+가/J 0.12 길이/N 0.85 길에/A 0.03 <literary style-news-sports> 123 길/N+가/J 0.08 길이/N 0.91 길이/A 0.01 <colloquial style-drama>}

[Pre-Analyzed Domain-Specific Context Dictionary]

knowledge format:: {corresponding word_left morpheme vocabulary1_left morpheme vocabulary2_*_right morpheme vocabulary pre-analyzed frequency}

Example 2

{길이_새롭_ㄴ_*_열리 길/N+가-/J3}

Example 3

{길이_새롭_ㄴ_*_측정 길이/N 2}

As described above, the adaptive morpheme analysis is performed based on the pre-analyzed morpheme statistical dictionary 204 and the pre-analyzed domain-specific context dictionary 305 which are suitable for the style and domain of the input caption sentence. As a result, translation performance is improved.

Then, if the caption sentence is tokenized in units of morphemes by the morpheme analysis part 106, the sentence pattern application part 107 performs sentence-by-sentence translation based on the sentence pattern dictionary 203 loaded into the main memory-based on a token sequence in units of morphemes.

Here, a common translation pattern frequently emerging in each style and domain is stored in the sentence pattern dictionary 203, and thus high-quality translation for common expressions frequently emerging in technical manuals, patent documents, broadcast news, and colloquial style sentences may be performed. Examples of the sentence pattern dictionary 203 are as follows:

[Sentence Pattern Dictionary]

Example 4

NP1 에서NP2 특파원이 전해왔습니다. >
Correspondent NP2 reported from NP1.

Example 5

현재 전국 대부분 지장이 대체로 맑은 날씨로 보이고 있지만 우리나라 NP1 에서 점차 많은 구름이 접근하고 있습니다> Now, it is mostly clear skies over most of the country, but lots of clouds are gradually coming from NP1 of our country.

Example 6

언제NP1 에 올 예정인가? >When are you coming back to NP1?

Next, if a sentence pattern which can be applied to the token sequence in units of morphemes does not exist in the sentence pattern dictionary 203, the syntax analysis part 108 analyzes syntax of the caption sentence based on declinable words and produces a parse tree.

Here, when producing the syntax parse tree of the caption sentence, the syntax analysis part 108 determines reliance between each morpheme node and syntax based on the domain-specific word co-occurrence dictionary for structure analysis 310. Examples of the domain-specific word co-occurrence dictionary for structure analysis 310 are as follows:

[Domain-Specific Word Co-Occurrence Dictionary for Structure Analysis]

knowledge format:: {preceding part-of-speech (POS) 1_followingPOS2_preceding part of last word1_following part of last word2 frequency1 <domain1> frequency2 <domain2> . . . frequency n <domain n>}

Example 7

{if pvg_pvg__ㄴ다면_ㄴ5 <literary style-general> 4 <literary style-news-economy> 2 <colloquial style-drama>}

Example 8

{if pvg_pvg__ㄴ 다면_고1 <literary style-general> 2 <literary style-news-society> 3 <colloquial style-drama>}

Example 9

{시스템_를_개발하20.5 <literary style-general> 40 <literary style-news-sports> 32 <colloquial style-drama>}

The pattern-based translation generation part 109 produces a pattern-based translation of the caption sentence using the translation pattern by the predicate phrase based on the domain-specific predicate phrase translation pattern dictionary 309 and the vocabulary/meaning context dictionary 205. Examples of the domain-specific predicate phrase translation pattern dictionary 309 and the vocabulary/meaning context dictionary 205 are as follows:

[Domain-Specific Predicate Phrase Translation Pattern Dictionary]

Example 10

{용기courage^감정72 use_of_instrument^그릇17 <literary style-general> use_of_instrument^그릇74 courage^감정0 <literary style-science>}

[Vocabulary/Meaning Context Dictionary]

Example 11

{용기-를-갖courage^감정3}

Example 12

{용기-를-냉각하use_of_an_instrunment^그릇2}

Then, when the translation of the caption sentence is produced in the pattern-based translation generation part 109, the translation combination part 110 combines and outputs the input broadcast signal and the translation through the input terminal IN.

Here, for the closed caption, video/audio/caption text/translated caption text are combined, and the text document input through the USB port is output with the translated text document.

Then, the broadcast signal output from the translation combination part 110 is output to an external media device connected through the output terminal OUT.

As described above, the domain-adaptive portable machine translation device for closed captions in the present invention is constructed to be capable of being independently connected to any media device, and also provides an optimal translation environment by automatically recognizing the style and domain of the caption sentence and restructuring the translation knowledge and module specialized for the style and the domain. Thus, high-quality specialized translation may be performed for all styles and domains such as technical manuals, patent documents, closed captions, general text, etc., according to application of these dynamic translation resources.

A translation method for a domain-adaptive portable machine translation device for closed captions will now be described in detail with reference to the accompanying drawings.

Figure 2:
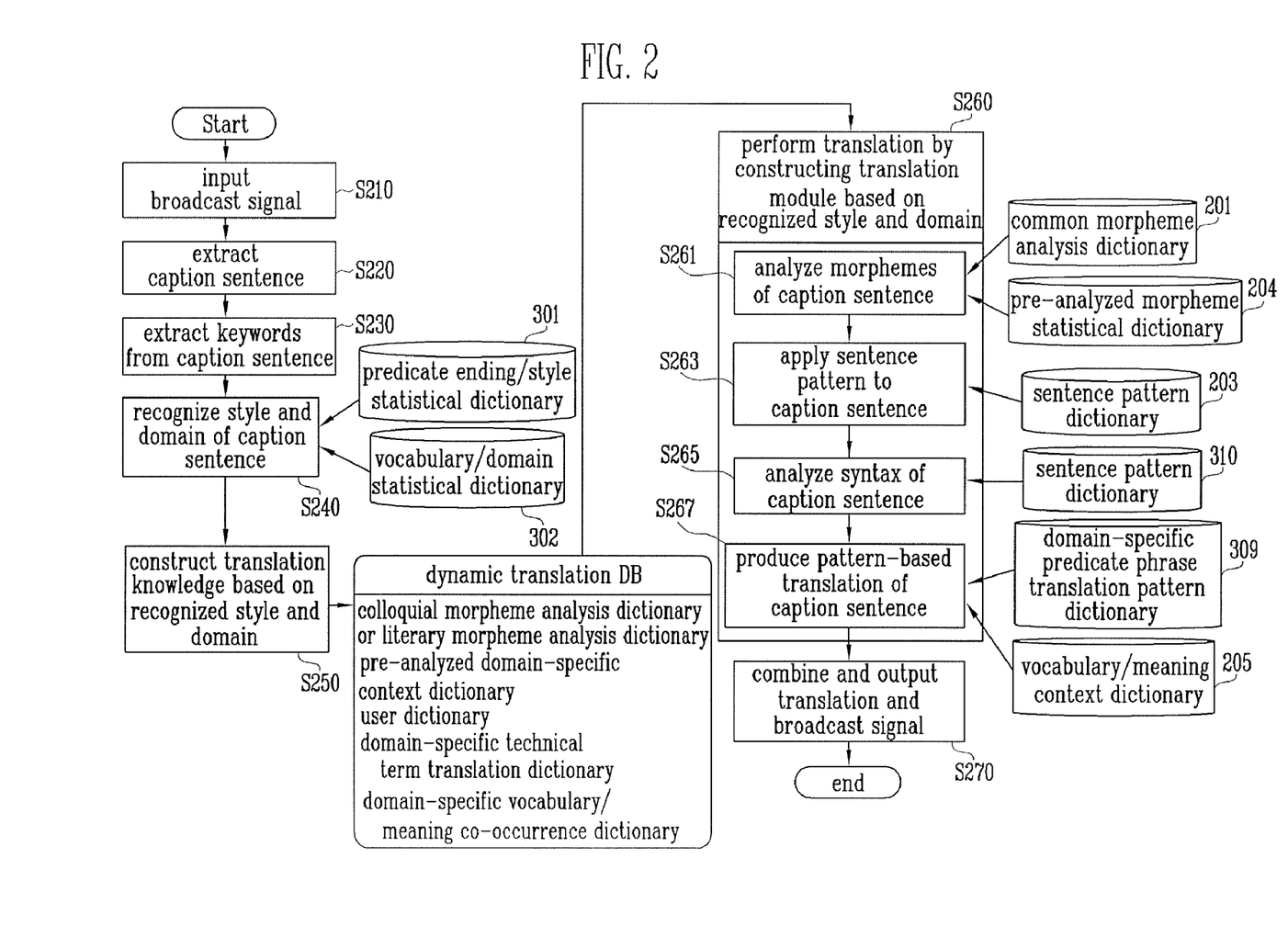
FIG. 2 is a flowchart illustrating a translation method for a domain-adaptive portable machine translation device for closed captions according to the present invention.

FIG. 2 is a flowchart illustrating a translation method for a domain-adaptive portable machine translation device for closed captions according to the present invention.

For convenience, the method will be described assuming that the portable machine translation device for closed captions is connected to another media device, for example, a PC connected to the Internet, a set-top box for a satellite TV, a cable TV, a video player, a USB disc, etc., through input/output connection terminals.

First, when the broadcast signal is input through another media device (S210), a caption sentence is extracted from the input broadcast signal (S220).

Morphemes of the extracted caption sentence are analyzed and keywords corresponding to nouns or declinable words are extracted therefrom (S230).

Then, style and domain of the caption sentence are recognized based on the extracted keywords, a pre-constructed predicate ending/style statistical dictionary 301 and a pre-constructed vocabulary/domain statistical dictionary 302 (S240). The method of recognizing the style and domain of the sentence is fully described above with reference to FIG. 1 and thus will be only briefly described below.

It is determined whether the caption sentence is written in a colloquial style or a literary style by comparing the frequency of a last word of the caption sentence occurring in the colloquial style with the frequency of a last word of the caption sentence occurring in the literary style according to the predicate ending/style statistical dictionary 301. Then, the domain of the caption sentence is determined by comparing the frequencies of the keyword per domain based on the pre-constructed vocabulary/domain statistical dictionary 302.

In an exemplary embodiment of the present invention, style is either colloquial or literary. Colloquial style is divided into 5 domains (drama, talk show, entertainment, interview, and other), and literary style is divided into 3 domains (news, educational, and other). The news domain is subdivided into 10 sub-domains (politics, economy, society, life/culture, international, science, entertainment, sports, weather, and other).

Meanwhile, if the style and domain of the caption sentence are recognized, translation knowledge is dynamically constructed based on the recognized style and domain data, and the constructed knowledge is loaded into a dynamic translation DB 206 (S250). The dynamic construction of the translation knowledge will be described in detail below.

If the caption sentence is written in the colloquial style, a colloquial style morpheme analysis dictionary 303 is loaded into the dynamic translation DB 206 of a main memory. Whereas, if the caption sentence is written in the literary style, a literary style morpheme analysis dictionary 304 is loaded into the dynamic translation DB 206.

A pre-analyzed domain-specific context dictionary 305 is loaded into the dynamic translation DB 206 using the recognized domain data.

A special user dictionary 306 is loaded into the dynamic translation DB 206 using the user data.

Thus, the translation knowledge is dynamically constructed to be suitable for the style and domain of the caption sentence and then loaded into the dynamic translation DB 206.

In result, translation quality is enhanced compared to a conventional machine translation system using common translation knowledge.

Then, a translation module is dynamically constructed based on the recognized style and domain data, and then translated (S260), which will be described in more detail below.

First, adaptive morpheme analysis is performed based on heuristic rules specialized for the recognized style and domain, thereby tokenizing the input caption sentence in units of morphemes (S261).

Here, in the morpheme analysis, the analysis may be performed based on a common morpheme analysis dictionary 201 and a pre-analyzed morpheme statistical dictionary 204 basically loaded into the main memory, and the literary style morpheme analysis dictionary 304, the pre-analyzed domain-specific context dictionary 305, the user dictionary 306, a domain-specific technical terms translation dictionary 307 and a domain-specific vocabulary/meaning co-occurrence dictionary 308 loaded into the dynamic translation DB 206 of the main memory. The heuristic rules may include rules suitable for each style and domain, such as abridged form treatment, predicate ending treatment, etc.

When the caption sentence is tokenized in units of morphemes, sentence-by-sentence translation is performed by applying a sentence pattern with respect to a token sequence in units of morphemes based on the sentence pattern dictionary 203 loaded into the main memory (S263).

Here, commonly used translation patterns frequently emerging in each style and domain are stored in the sentence pattern dictionary 203, and thereby high-quality translation of commonly used expressions frequently emerging in technical manuals, patent documents, broadcast news and colloquial sentences can be performed.

If the sentence pattern applicable to the token sequence in units of morphemes does not exist in the sentence pattern dictionary 203, syntax of the caption sentence is analyzed based on a declinable word, and a parse tree is produced (S265).

Here, in the production of the syntax parse tree of the caption sentence, reliance between syntax and each morpheme node may be determined based on a domain-specific word co-occurrence dictionary for structure analysis 310.

After the parse tree by the predicate phrase is produced, the caption sentence is translated into a target language using the translation pattern by the predicate phrase based on the domain-specific predicate phrase translation pattern dictionary 309 and the vocabulary/meaning context dictionary 205 (S267).

After the translation of the caption sentence is produced, the translation and the input broadcast signal are combined and then output to a connected external media device (S270).

Here, for the closed caption, video/audio/caption text/translated caption text are combined, and the text document input through the USB port is output with the translated text document.

As such, according to the translation method for the domain-adaptive portable machine translation device for closed captions, the style and domain of the closed caption are automatically recognized and a suitable specialized translation module and knowledge are dynamically constructed, thereby performing automatic translation using optimal translation resources suitable for a corresponding sentence. Thus, high-quality translation in various specialized domains can be performed.

Meanwhile, the exemplary embodiments described above can be written as a computer program, stored on a computer-readable medium, and executed by a typical computer.

As described above, the style and domain of the closed caption are automatically recognized and a suitable specialized translation module and knowledge are dynamically constructed, thereby performing automatic translation with optimal translation resources suitable for a corresponding sentence. Thus, high-quality translation in various specialized domains can be performed.

Also, according to the present invention, the domain-adaptive portable machine translation device for closed captions may be operated independently of a PC connected to the Internet, a set-top box for a satellite TV, a cable TV, a video player, a USB disc, and so on, and also may be freely linked with such media devices through input/output terminals.

Moreover, according to the present invention, a translation dictionary suitable for the style and domain of the caption sentence is loaded into a main memory to translate the caption sentence. Therefore, translation dictionary access time is reduced and thus high-speed translation may be performed compared to a conventional machine translation system.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A domain-adaptive portable machine translation device for closed captions, comprising:
    a keyword extraction part extracting a plurality of keywords from an input caption sentence, wherein the keywords includes a last word and at least one noun in the caption sentence;
    a style and domain recognition part recognizing a style and a domain of the caption sentence from a literary or colloquial style and a plurality of domains,
    wherein the style is recognized based on the extracted last word and a pre-constructed predicate ending/style statistical dictionary,
    wherein after the style is recognized then the domain is recognized based on the extracted keywords and a pre-constructed vocabulary/domain statistical dictionary;
    a dynamic translation knowledge construction part dynamically loading, into a dynamic translation database (DB) of a main memory, a colloquial morpheme analysis dictionary or a literary morpheme analysis dictionary based on the recognized style and a pre-analyzed domain-specific context dictionary, a domain-specific technical terms translation dictionary and a domain-specific vocabulary/meaning co-occurrence dictionary based on the recognized domain
    a dynamic translation module construction part dynamically reconstructing a translation module based on the recognized style and domain;
    a morpheme analysis part analyzing morphemes of the caption sentence under a control of the dynamic translation module construction part;
    a sentence pattern application part performing sentence-by-sentence translation by applying a sentence pattern to the caption sentence under a control of the dynamic translation module construction part;
    a syntax analysis part analyzing syntax of the caption sentence under a control of the dynamic translation module construction part; and
    a pattern-based translation generation part producing a pattern-based translation of the caption sentence based on the syntax analysis result.

2. The machine translation device according to claim 1, further comprising:
    a sentence extraction part extracting the caption sentence from an input broadcast signal; and
    a translation combination part combining the input broadcast signal and the translation produced through the pattern-based translation generation part.

3. The machine translation device according to claim 1, wherein the style and domain recognition part determines whether the caption sentence conforms to a literary style or a colloquial style by comparing frequency of the last word of the caption sentence occurring in the colloquial style with frequency of the last word of the caption sentence occurring in the literary style based on the predicate ending/style statistical dictionary.

4. The machine translation device according to claim 3, wherein a knowledge format of the predicate ending/style statistical dictionary is {last word/frequency in colloquial style/frequency in literary style}.

5. The machine translation device according to claim 1, wherein the style and domain recognition part determines the domain of the caption sentence by comparing frequencies of the extracted keyword in the plurality of different domains based on the vocabulary/domain statistical dictionary.

6. The machine translation device according to claim 5, wherein a knowledge format of the vocabulary/domain statistical dictionary is {corresponding term/domain1, frequency1/domain2, frequency2/ . . . /domain n, frequency n}.

7. The machine translation device according to claim 1, wherein the morpheme analysis part tokenizes the caption sentence in units of morphemes by performing morpheme analysis based on at least one selected from the group comprising of heuristic rules suitably specialized for the recognized style and domain, a common morpheme analysis dictionary, a pre-analyzed morpheme statistical dictionary, and the dictionaries loaded into the dynamic translation DB by the dynamic translation knowledge construction part.

8. The machine translation device according to claim 7, wherein a knowledge format of the pre-analyzed morpheme statistical dictionary is {corresponding word frequency pre-analysis1 probability1 frequency1 pre-analysis2 probablity2 frequency2 . . . pre-analysis n probability n frequency n <domain1> frequency pre-analysis1 probability1 frequency1 pre-analysis 2 probability 2 frequency 2 . . . pre-analysis n probability n frequency n <domain2> . . . frequency pre-analysis1 probability1 frequency1 pre-analysis 2 probability 2 frequency 2 . . . pre-analysis n probability n frequency n <domain n>}.

9. The machine translation device according to claim 7, wherein a knowledge format of the pre-analyzed domain-specific context dictionary is {corresponding word_left morpheme vocabulary1_left morpheme vocabulary2_*_right morpheme vocabulary pre-analysis frequency}.

10. The machine translation device according to claim 1, wherein the syntax analysis part produces a syntax parse tree by analyzing syntax of the caption sentence based on the domain-specific word co-occurrence dictionary for structure analysis, when a sentence pattern applicable to the caption sentence does not exist.

11. The machine translation device according to claim 10, wherein a knowledge format of the domain-specific word co-occurrence dictionary for structure analysis is {preceding part-of-speech (POS)1_followingPOS2_preceding part of last word1_following part of last word2 frequency1 <domain1> frequency2 <domain2> . . . frequency n <domain n>}.

12. The machine translation device according to claim 1, wherein the pattern-based translation generation part produces a pattern-based translation of the caption sentence based on the syntax analysis result, a domain-specific predicate phrase translation pattern dictionary, and a vocabulary/meaning context dictionary.

13. A translation method for a domain-adaptive portable machine translation device for closed captions, comprising the steps of:
  (a) extracting a plurality of keywords from an input caption sentence, wherein the keywords includes a last word and at least one noun in the caption sentence;
  (b) recognizing a style and a domain of the caption sentence from literary or colloquial style and a plurality of domains,
  wherein the style is recognized based on the extracted last word and a pre-constructed predicate ending/style statistical dictionary,
  wherein after the style is recognized then the domain is recognized based on the extracted keywords and a pre-constructed vocabulary/domain statistical dictionary;
  (c) dynamically loading, into a dynamic translation database (DB) of a main memory, a colloquial morpheme analysis dictionary or a literary morpheme analysis dictionary based on the recognized literary/colloquial style and a pre-analyzed domain-specific context dictionary, a domain-specific technical terms translation dictionary and a domain-specific vocabulary/meaning co-occurrence dictionary based on the recognized domain;
  (d) dynamically reconstructing a translation module based on the recognized style and domain;
  (e) analyzing morphemes of the caption sentence based on the recognized style and domain;
  (f) performing sentence-by-sentence translation by applying a sentence pattern to the caption sentence based on the recognized style and domain;
  (g) analyzing syntax of the caption based on the recognized style and domain; and
  (h) producing a pattern-based translation of the caption sentence based on the syntax analysis result.

14. The translation method according to claim 13, further comprising the steps of:
  extracting the caption sentence from an input broadcast signal; and
  combining the input broadcast signal and the translation produced through step (h).

15. The translation method according to claim 13, wherein step (b) comprises the steps of:
  determining whether the caption sentence is written in a literary style and a colloquial style by comparing frequency of the last word of the caption sentence occurring in the colloquial style with frequency of the last word of the caption sentence occurring in the literary style based on the predicate ending/style statistical dictionary; and
  determining the first domain of the caption sentence by comparing frequencies of the extracted keyword in the plurality of different domains based on the vocabulary/domain statistical dictionary.

16. The translation method according to claim 13, wherein step (e) comprises the step of:
  tokenizing the caption sentence in units of morphemes by performing morpheme analysis based on at least one from the group comprising of heuristic rules, a common morpheme analysis dictionary and a pre-analyzed morpheme statistical dictionary specialized for the recognized first style and first domain and the dictionaries loaded into the dynamic translation DB.

17. The translation method according to claim 13, wherein step (g) comprises the steps of: when a sentence pattern applicable to the caption sentence does not exist,
  analyzing syntax of the caption sentence based on a domain-specific word co-occurrence dictionary for structure analysis; and
  producing a syntax parse tree.

18. The translation method according to claim 13, wherein step (h) comprises the step of:
  producing a pattern-based translation of the caption sentence based on the syntax analysis result, a domain-specific predicate phrase translation pattern dictionary and a vocabulary/meaning context dictionary.

* * * * *